(12) United States Patent
Tarr

(10) Patent No.: US 6,686,917 B2
(45) Date of Patent: Feb. 3, 2004

(54) MINE LITTORAL THREAT ZONE VISUALIZATION PROGRAM

(75) Inventor: Paulo Bertell Tarr, Silver Spring, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 572 days.

(21) Appl. No.: 09/746,535

(22) Filed: Dec. 21, 2000

(65) Prior Publication Data

US 2002/0080138 A1 Jun. 27, 2002

(51) Int. Cl.$^7$ ............................................... G06T 15/00
(52) U.S. Cl. ........................................................ 345/441
(58) Field of Search ................................. 345/419, 420, 345/421, 422, 619, 440, 441, 442

(56) References Cited

U.S. PATENT DOCUMENTS

| | | | |
|---|---|---|---|
| 4,055,121 A | 10/1977 | Jasperson et al. | 102/414 |
| 4,185,326 A | 1/1980 | Whittaker | 367/96 |
| 4,648,041 A | 3/1987 | Tarr | 324/228 |
| 4,766,385 A | 8/1988 | Polvani | 324/345 |
| 5,277,117 A | 1/1994 | Bender et al. | 102/402 |
| 5,623,524 A | 4/1997 | Weiss et al. | 367/99 |
| 5,698,813 A | 12/1997 | Ramsay et al. | 102/407 |
| 6,054,986 A | 4/2000 | Kato | 345/763 |
| 6,469,664 B1 * | 10/2002 | Michaelson et al. | 342/357.13 |
| 6,508,192 B2 * | 1/2003 | Lentine | 114/343 |
| 6,520,105 B2 * | 2/2003 | Koda et al. | 114/255 |

* cited by examiner

Primary Examiner—Phu K. Nguyen
(74) Attorney, Agent, or Firm—Howard Kaiser

(57) ABSTRACT

Computer-implemented methodology for being visually informative as to risks associated with sea mines which may be present in geographical regions of interest. A region is selected, topographical data pertaining to such region is acquired, a "safe-depth" (water depth demarcation between significant risk thereabove and insignificant risk therebelow) is designated, and a map of such region is displayed. In a visibly differentiable manner, the map depicts existing water areas in which sea mine risk is significant, existing water areas in which sea mine risk is insignificant, and existing land areas. In relation to a particular region, the nature and bounds of sea mine risk and/or lack thereof can be readily, completely and detailedly ascertained by viewing a computer display and effectuating appropriate computer operations. On individual ships, alarms can be installed which suitably actuate responsively to sea mine risks.

28 Claims, 5 Drawing Sheets

MINE LITTORAL THREAT ZONE VISUALIZATION PROGRAM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to explosive devices such as mines which are situated in a marine environment, more particularly to methods and apparatuses involving the anticipation, recognition or avoidance of underwater mines and minefields.

A mine is an explosive device which is usually concealed either underground or underwater, and which is used primarily by military forces for defensive purposes. Mines generally are difficult to detect and thus pose great threats to troops and ships. Most mines are "independent mines" inasmuch as they are not controlled by the user after laying; they permit the defending military force to concentrate its personnel elsewhere, since the mines, once laid, do not require human maintenance or operation.

Mines typically are self-contained devices which include an explosive capability and a detonator (a firing mechanism for triggering the mine explosion), and which explode when touched by or approached by a target. "Minefields" are areas where mines have been placed. Generally, there are two categories of mines, based on their situation, viz., "land mines" and "underwater mines."

A typical land mine comprises an explosive charge buried just below the surface of the ground. Land mines can be set to fire, for example, in response to weight (e.g., of vehicles or troops) thereon, or upon the passage of time, or via remote control. "Antipersonnel mines" are designed to target people. "Antitank mines" are designed to target tanks and other land vehicles.

Underwater mines are synonymously referred to as "water mines," "submarine mines," "sea mines" or "naval mines." As used herein, the terms "water mine," "underwater mine," "submarine mine," "sea mine" and "naval mine" are considered interchangeable; any of these terms broadly represents a mine which is situated in or on water or contiguously with respect to water or which otherwise bears physical or functional relation to a water environment. A typical underwater mine comprises an explosive charge positioned underwater and set to fire in response to the presence of a marine vehicle (e.g., a ship or submarine) in contact therewith or in proximity thereto. Underwater mines are generally laid in the water for purposes of damaging or sinking ships or of deterring ships from entering an area.

"Moored mines" are underwater mines having positive buoyancy, typically held below the water surface at a preselected depth by a mooring (e.g., cable) attached (e.g., tethered) to an anchor (e.g., on a sea bottom). "Bottom mines" are underwater mines having negative buoyancy and resting on a seabed (e.g., at the bottom of relatively shallow water). "Floating mines" are underwater mines which are not entirely underwater but are visible on the surface.

Underwater mines are triggered either by direct contact or by indirect influence. When an underwater mine is triggered, an expanding gas sphere caused by the explosion sends shock waves through the water, these shock waves having deleterious effects on the nearby target marine vessel. "Contact mines" are actuated as a result of physical contact between the target ship and the mine's casing or one or more of the mine's appendages (e.g., rods or antennae protruding from the mine's surface). "Influence mines" are actuated either as a result of sensing an "influence field" emanating from the target marine vessel, or as a result of the target marine vessel's intrusion within an "influence field" emanating from the mine. Generally, influence mines sense changes in physical patterns in surrounding water, such as pertaining to magnetic fields ("magnetic mines"), pressure change ("pressure mines") or sound waves ("acoustic mines").

An important aspect of naval defense involves the assessment of various regions of the world wherein the presence of underwater mines constitutes a threat to vehicles navigating such waters. Currently, littoral mine threat zones have to be plotted manually from navigational charts. This is a time-consuming and error-prone task. It would be desirable to avail of a more efficient strategy or approach for evaluating mine threats to marine vessels.

SUMMARY OF THE INVENTION

In view of the foregoing, it is an object of the present invention to provide method and apparatus for effectively and expeditiously assessing, within a particular geographical area, the existence of navigational risk associated with underwater mine capability.

It is a further object of the present invention to provide, in association with accomplishing same, method and apparatus for selecting such particular geographical area from among a number of geographical areas or from a larger geographical area which encompasses said particular geographical area.

In accordance with many embodiments of the present invention, a method is provided for displaying data pertaining to water mine threat on a display screen of a computer. The inventive method comprises: accessing (e.g., acquiring or gaining access to) information relating to the topography of a region which includes at least one body of water; selecting a water depth below which the water mine threat is considered an insignificant water mine threat and above which the water mine threat is considered a significant water mine threat; and, displaying a map of the region which exhibits at least one of the insignificant water mine threat and the significant water mine threat.

Typical inventive practice provides that if the map exhibits both the insignificant water mine threat and the significant water mine threat, the map exhibits contrastingly, in terms of geographical extent or scope, the insignificant water mine threat versus the significant water mine threat. If the region includes one or more land portions, and if the map exhibits the insignificant water mine threat, the map exhibits contrastingly the insignificant water mine threat versus the one or more land portions. If the region includes one or more land portions, and if the map exhibits the significant water mine threat, the map exhibits contrastingly the significant water mine threat versus the one or more land portions. If the region includes one or more land portions, and if the map exhibits both the insignificant water mine threat and the significant water mine threat, the map exhibits contrastingly the insignificant water mine threat versus the significant water mine threat versus the one or more land portions; that is, the insignificant water mine threat, the significant water mine threat and the nonexistent water mine threat (associated with the one or more land portions) are shown contrastingly with respect to each other. In other words, generally according to the present invention, the three main mine threat categories—namely, "insignificant" (or inconsequential, negligible, inconsiderable, insubstantial, etc.), "significant" (or consequential, considerable, substantial, etc.) and "nonexistent"—if and to the degree that they are present in the selected geographical region, are shown in mutually contrasting fashion.

Further provided in accordance with the present invention is a computer program product for use in a computer system having a central processor for implementing graph display management on a user interface display screen. The computer program product enables visual representation of a geographical area in terms of explosive threat such as mine threat to marine navigation. The present invention's computer program product comprises: a recording medium; means, recorded on the recording medium, for obtaining data pertaining to the geographical area from a geographical database, the data including information pertaining to the terrain of the geographical area; means, recorded on the recording medium, for choosing at least one safe-depth, each said safe-depth at least approximately being the maximum marine depth beyond which a mine threat to a contemplated marine vessel is considered negligible; and means, recorded on the recording medium, for graphically displaying the geographical area as indicative of mine threat sectionalization as a function of at least one safe-depth. The mine threat sectionalization includes at least one type of zone selected from the group consisting of land mass zone, mine threat zone and mine safety zone. The mine threat zone is at least substantially characterized by a marine bed which is shallower than the safe-depth. The mine safety zone is at least substantially characterized by a marine bed which is deeper than the safe-depth.

Further provided in accordance with the present invention is a system for visualizing navigational risk associated with water mine capability which may exist in a geographical region which includes water. The inventive system comprises: means for accessing information relating to the topography of the region; means for selecting a delimitative depth of the water, wherein at water mine situation depths greater than the delimitative depth the navigational risk is deemed an inconsequential risk, and wherein at water mine situation depths lesser than the delimitative depth the navigational risk is deemed a consequential risk; and means for displaying a map of the region, wherein the map illustrates at least one of the inconseqential risk and the consequential risk, and wherein when the map illustrates both the inconsequential risk and the consequential risk, the map illustrates the inconsequential risk and the consequential risk in contrast to each other. According to frequent inventive practice, the subject region includes not only water but also land; hence, typically according to this invention, when the map illustrates the inconsequential risk, the map illustrates the land and the inconsequential risk in contrast to each other, and when the map illustrates the consequential risk, the map illustrates the land and the consequential risk in contrast to each other. Many inventive embodiments of a system for visualizing navigational risk further comprise means for selecting the geographical region, for instance via latitude and longitude, or from a preconceived menu of plural regions.

According to many embodiments of the present invention, speedy visualization is achievable of the location or locations of mine threat to naval vessels in any littoral area, worldwide. For typical inventive embodiments, the mine threat display is based on a particular vessel's "safe-depth" against a particular mine. The "safe-depth" is the demarcative water depth whereby the marine vessel is considered threatened by an underwater mine placed above the demarcative water depth, and whereby the marine vessel is considered unthreatened by an underwater mine placed below the demarcative water depth. In usual inventive practice, the safe-depth depends on the underwater relief of the geographical area in question, since the underwater mine is presumed to be rather closely situated with respect to the floor of the water body (e.g., ocean, sea, gulf, bay, harbor, river, etc.). Frequently, the geographical region of interest is at, near or along a coastline of a land mass; hence, according to typical inventive practice, it will frequently be the case that the geographical region of interest encompasses both (i) one or more land areas and (ii) one or more water areas.

The present invention, in some of its preferred embodiments, enables rapid visualization of sea mine threat zones anywhere in the world. According to typical embodiments of the present invention, area selection is accomplished through latitude and longitude entry with a two-dimensional preview display of the selected area. The selected area is extracted from a world elevation database and displayed as a three-dimensional filled polygonal mesh with one or more color-coded threat zones (e.g., mine threat zones versus mine safety zones); as desired, this three-dimensional image can be rotated, zoomed and/or shifted (e.g., using a mouse and/or keypad).

Many inventive embodiments provide for a computer-implemented regime according to which a two-dimensional image can initially be displayed, and a three-dimensional image can subsequently be displayed. For instance, the inventive practitioner can have the opportunity to more accurately define (e.g., "zero in on" or "fine-tune") the geographical region of interest, re-selecting and re-displaying the contemplated region until he or she is satisfied with its precise location and limits. When satisfied, the inventive practitioner can switch from two-dimensional image mode to three-dimensional image mode. The previously two-dimensional image of the satisfactorily defined region can then be rendered in a three-dimensional image form which is adjustable (e.g., rotatable to different perspectives or viewpoints) so as to enhance the inventive practitioner's understanding of the mine threat characteristics of the region. At any time or at a moment's notice, the inventive practitioner can shift his focus to an entirely different part of the world, whether in the same or opposite hemisphere. The achievement of three-dimensional visualization or the provision of three-dimensional visualization capability may not be necessary, depending on the inventive embodiment or application; that is, a two-dimensional image of a given region may suffice for purposes of imparting requisite mine threat information.

There are several advantages of the inventive methodology over previous methodologies. An inventive program can enable extremely rapid construction of the threat zone visualization for any area in the world. Moreover, the present invention's visualization can be in three dimensions, allowing for qualitative as well as quantitative evaluations of threat zone boundaries and safe navigation areas. In addition, the present invention's user interface dialog with its embedded preview display can enable the user to fine-tune the selection area (e.g., in two dimensions) before it is visualized in three dimensions. Furthermore, the inventive use of a world database is less error-prone than manually looking up depth values on a navigational chart.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

In FIG. 2, the selected geographical area is Hobart, Tasmania and the selected safe-depth is 100 feet. In FIG. 3, the selected geographical area is Hobart, Tasmania and the selected safe-depth is 300 feet.

In FIG. 4, the selected geographical area is the Persian Gulf and the selected safe-depth is 100 feet. In FIG. 5, the selected geographical area is the Persian Gulf and the selected safe-depth is 200 feet.

BRIEF DESCRIPTION OF THE APPENDICES

The following appendices are hereby made a part of this disclosure:

Attached hereto marked APPENDIX A, containing fourteen pages and incorporated herein by reference is an inventive embodiment of computer source code.

Attached hereto marked APPENDIX B, APPENDIX C, APPENDIX D and APPENDIX E, and incorporated herein by reference, are "color" versions of the "black-and-white" representations of FIG. 2, FIG. 3, FIG. 4 and FIG. 5, respectively.

DETAILED DESCRIPTION OF THE INVENTION

Figure 1:
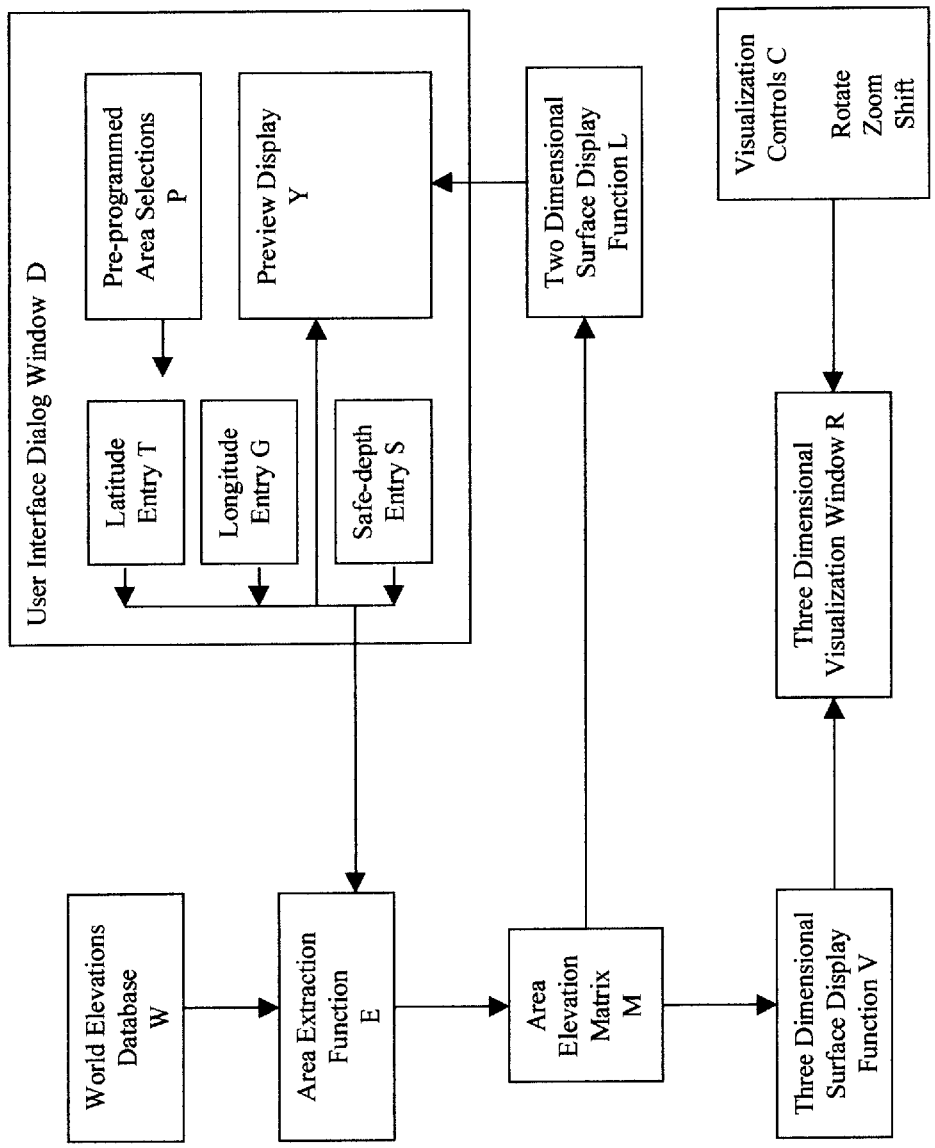
FIG. 1 is schematic representation of an embodiment of a mine littoral threat zone visualization program and method in accordance with the present invention.

Reference is now made to the figures and particularly to FIG. 1, which is block diagram and data flow of an embodiment of the inventive methodology, especially illustrating a mine littoral threat zone visualization computer program in accordance with the present invention, such as exemplified by APPENDIX A.

Figure 2:
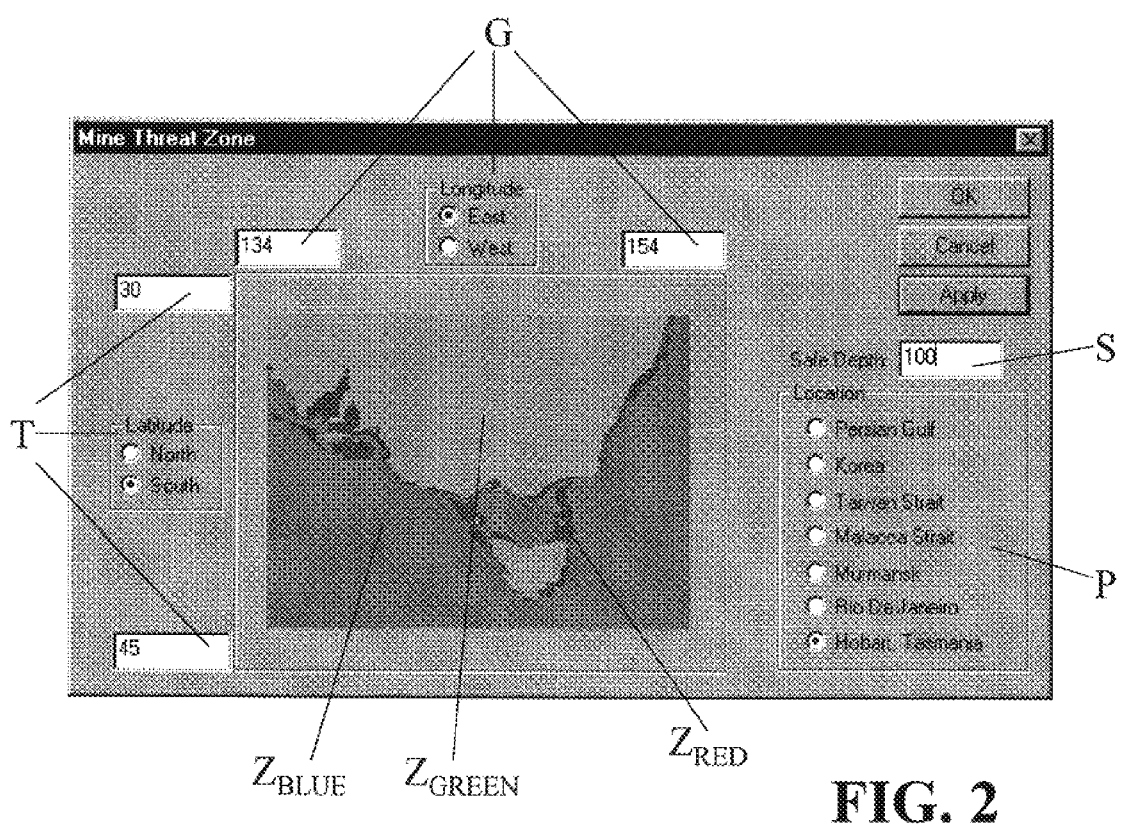
FIG. 2 and FIG. 3 are each a diagrammatic representation of a computer user interface which includes a two-dimensional visual display. In each of FIG. 2 and FIG. 3, the displayed image corresponds to a selected geographical area and a selected safe-depth.
Figure 3:
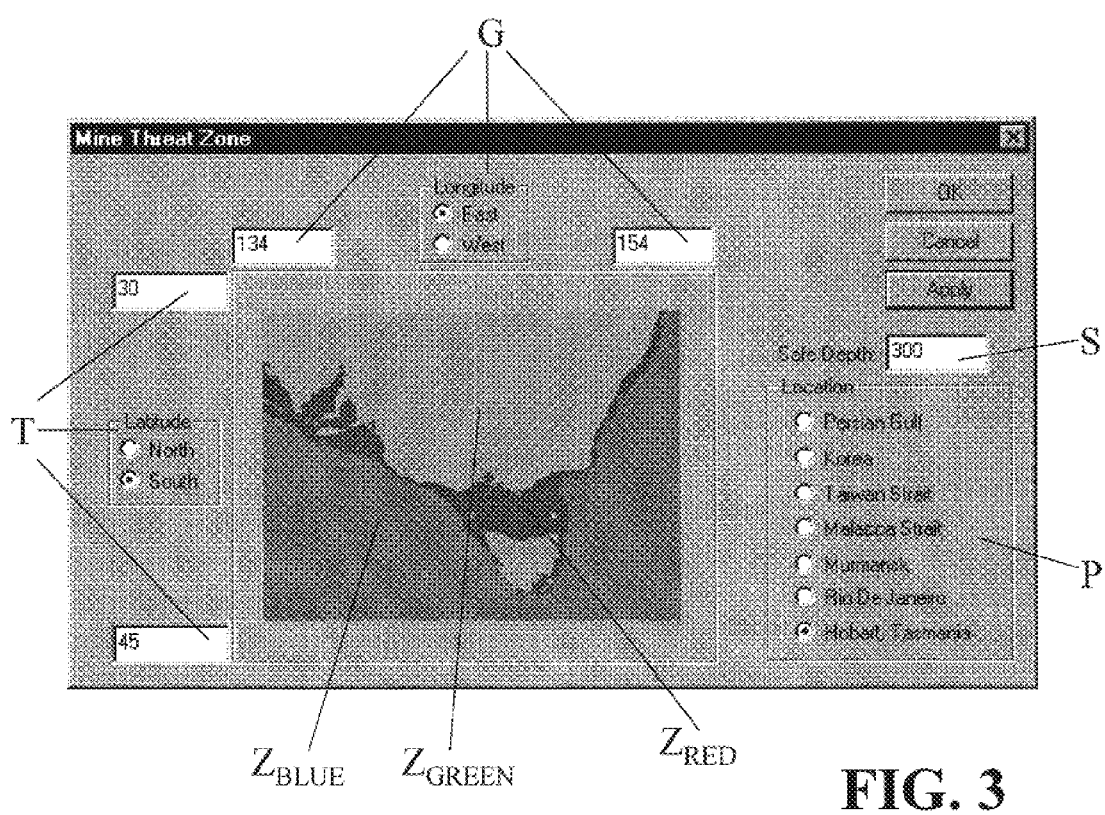

FIG. 2 and FIG. 3 are each exemplary of a user interface dialog window D which includes a latitude entry T, a longitude entry G, a safe-depth entry S and a pre-programmed area selection entry P. The inventive practitioner enters the latitude and longitude of the area to be visualized in the latitude entry T and the longitude entry G, respectively, of the user interface dialog window D. The vessel "safe-depth" is entered by the inventive practitioner in safe-depth entry S. The safe-depth is the greatest depth at which the mine under consideration ceases to fire on the vessel's signature.

As portrayed in FIG. 2 and FIG. 3, the inventive practitioner can select a geographical area by doing either of the following: (i) entering latitudinal coordinates in latitude entry T and longitudinal coordinates in longitude entry G; or, (ii) entering a selection from among a list of selections (pre-programmed area coordinates) in the pre-programmed area selection entry P. Latitude entry T includes a north-versus-south subentry (exemplified in FIG. 2 and FIG. 3 as "South") and two numerical subentries (exemplified in FIG. 2 and FIG. 3 as "30" degrees and "45" degrees) designating a fifteen degree latitudinal range. Similarly, longitude entry G includes an east-versus-west subentry (exemplified in FIG. 2 and FIG. 3 as "East") and two numerical subentries (exemplified in FIG. 2 and FIG. 3 as "134" degrees and "154" degrees) designating a twenty degree longitudinal range.

As shown in FIG. 2 and FIG. 3, the pre-programmed selections in entry P are identified by geographical names. Depending on the embodiment, either or both of (i) a latitudinal/longitudinal selection approach and (ii) a pre-programmed selection approach may be practicable in accordance with the present invention. Typically according to this invention, entries T and G together are alternative to entry P; that is, the combination of entries T and G will be implemented in lieu of entry P, or entry P will be implemented in lieu of the combination of entries T and G.

Following area selection, the area extraction function E extracts area elevations from the world elevations database W. The extracted area elevations are stored in the area elevation matrix M. The two-dimensional surface display function L then displays the selected area in the preview display Y of the user interface dialog window D.

FIG. 2 and FIG. 3 each depict an example of a two-dimensional surface "preview" display which is displayed by a two-dimensional surface display function L. Land masses in the selected area are displayed in green in APPENDIX B and APPENDIX C, and are correspondingly indicated as "$Z_{GREEN}$" in FIG. 2 and FIG. 3, respectively. Based on the safe-depth entry S, mine threat zones are displayed in red in APPENDIX B and APPENDIX C, and are correspondingly indicated as "$Z_{RED}$" in FIG. 2 and FIG. 3, respectively. Also based on the safe-depth entry S, safe navigation areas are displayed in blue in APPENDIX B and APPENDIX C, and are correspondingly indicated as "$Z_{BLUE}$" in FIG. 2 and FIG. 3, respectively.

The water mine threat is real or significant in an unsafe zone (e.g., a red-colored zone $Z_{RED}$ such as shown in FIG. 2 and FIG. 3, as well as in APPENDIX B and APPENDIX C). The water mine threat is negligible or insignificant in a safe zone (e.g., a blue-colored zone $Z_{BLUE}$ such as shown in FIG. 2 and FIG. 3, as well as in APPENDIX B and APPENDIX C). No water mine threat can be present in a land mass (e.g., a green-colored zone $Z_{GREEN}$ such as shown in FIG. 2 and FIG. 3, as well as in APPENDIX B and APPENDIX C), wherein navigable water is essentially absent, albeit a land mine threat can be present in a land mass.

Utilizing user interface dialog window D, any (one or more) of the entries from among latitude entry T, longitude entry G, safe-depth entry S and pre-programmed area selection entry P can be modified and the preview display thereby updated. For instance, if the previewed area is not acceptable to the inventive practitioner, the geographical coordinates of the area can be adjusted via either (i) the combination of entries T and G or (ii) entry P, thereby changing the preview display of function L. Or, perhaps the previewed area as well as the safe-depth need to be adjusted. To this purpose, T, G and S can each be modified in order to change the preview display of function L; or, P and S can each be modified in order to change the preview display of function L. Or, perhaps the previewed area is acceptable but the safe-depth entry S requires modification.

Figure 4:
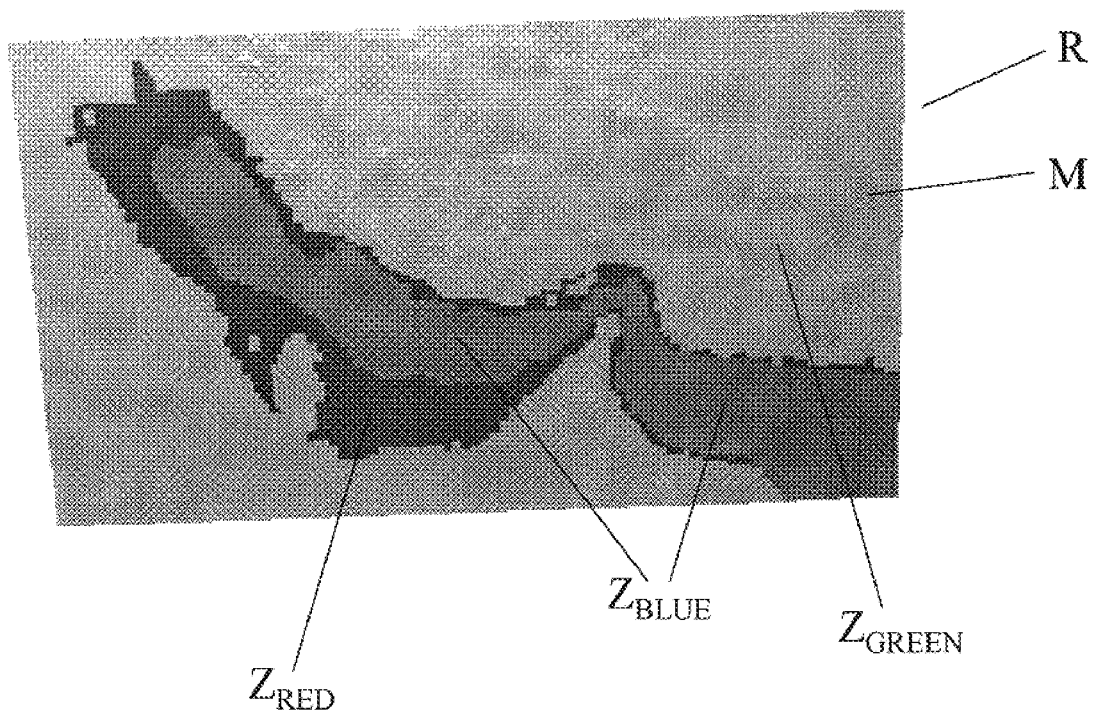
FIG. 4 and FIG. 5 are each a diagrammatic representation of a three-dimensional visual display, each based on a two-dimensional visual display of a kind such as shown in FIG. 2 and FIG. 3. In each of FIG. 4 and FIG. 5, the displayed image corresponds to a selected geographical area and a selected safe-depth.
Figure 5:
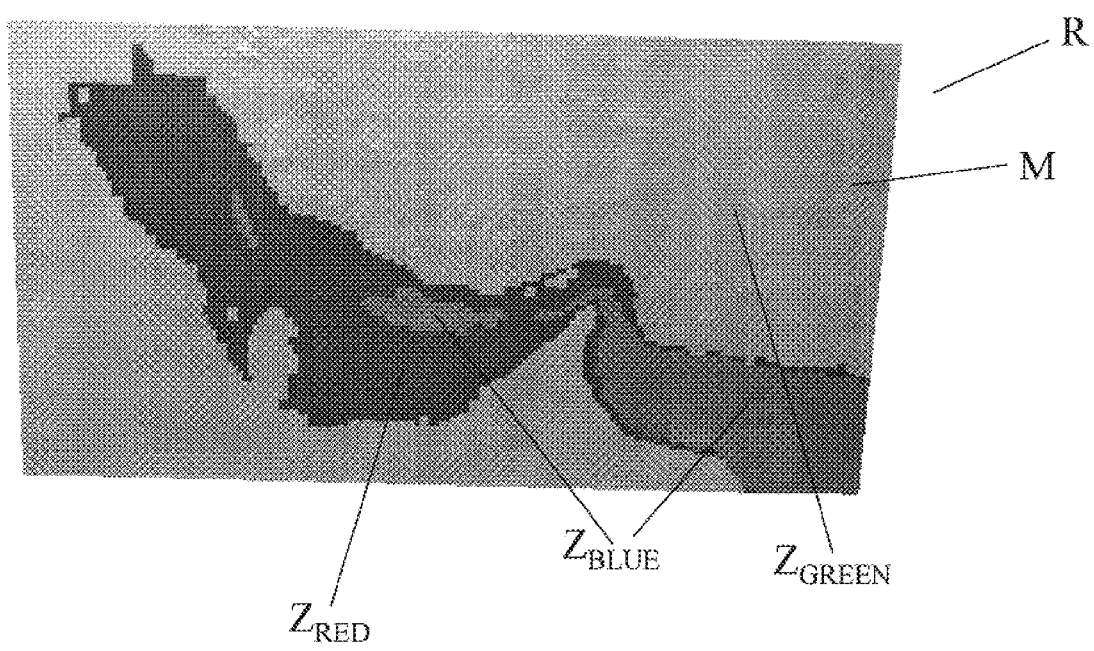

When the preview display of function L is acceptable, the user interface dialog window D is closed (e.g., by clicking on the "OK" button of user interface dialog window D shown in FIG. 2 and FIG. 3), and the three-dimensional surface display function V displays the chosen area elevation matrix M as a filled polygonal mesh in the three-dimensional visualization window R. FIG. 4 and FIG. 5 are illustrative of three-dimensional surface displays. Land mass polygons are displayed in green, mine threat zones polygons are displayed in red, and safe navigation area polygons are displayed in blue. The inventive practitioner can then use the visualization controls C (via mouse and keyboard) to rotate, zoom or shift the displayed three-dimensional surface.

FIG. 2 shows the user interface dialog window D, with the Hobart, Tasmania area selected from the pre-programmed area selection list P. The ETOPO$_5$ five minute gridded elevation database from the National Geophysical Data Center was used as the world elevations database W. The safe-depth is 100 feet. FIG. 3 shows the [same] Hobart area with a safe-depth of 300 feet. Note the resulting increase in the red mine threat zone.

The U.S. Department of Commerce includes the National Oceanic and Atmospheric Administration (NOAA), which includes the National Geophysical Data Center (NGDC). As stated in the NGDC web page at http://www.ngdc.noaa.gov/, the NGDC "is the national repository for geophysical data, providing a wide range of science data services and information." Among the information made available to the public by the NGDC is the ETOPO$_5$ five-minute gridded elevation data. ETOPO$_5$ data is available from the NGDC both online and on CD-ROM; see, e.g., the NGDC web page at http://www.ngdc.noaa.gov/mgg/global/etopo$_5$.HTML (e.g., Nov. 16, 2000 version, incorporated herein by reference), wherein is stated, inter allia: "ETOPO$_5$ was generated from a digital data base of land and sea-floor elevations on a 5-minute latutude/longitude grid. The resolution of the gridded data varies from true 5-minute for the ocean floors, the USA, Europe, Japan, and Australia to 1 degree in data-deficient parts of Asia, South America, northern Canada, and Africa . . . . The data file is formatted as 16-bit BINARY INTEGERS in two byte orders: ETOPO$_5$.DOS is in IBM-PC/DEC-VAX "swapped," lo-byte-first order. The file ETOPO$_5$.DAT is in "normal," or hi-byte-first order, as used by Macintosh, Sun, and some other workstations. In both files, there are 2160X4320 data values, one for each five minutes of latutude and longitude, for a total of 9,331,200 points or 18,662,400 bytes . . . . In general, the data sets for the USA, Western Europe, Korea/Japan, Australia and New Zealand are the most precise, having a horizontal resolution of five minutes of latitude and longitude, and vertical resolution of 1 meter. Data for Africa, Asia, and South America vary in resolution from +/− a few meters to only representing every 150 m (500 feet), depending on the available source data. Very little detail is contained in the oceanic data shallower than 200 m; the interpolation algorithm used by the US Navy to create the oceanic grid from contour charts was set to an arbitrary cutoff of −10 m wherever the algorithm would have "overshot" and marked points as above sea level . . . ."

It is thus noted that the ETOPO$_5$ elevation database is essentially characterized by a 5 minute grid. The ETOPO$_5$ data is suitable for many inventive embodiments. Nevertheless, for greater accuracy, a world elevation database with a smaller grid for higher resolution can be used in accordance with the present invention.

A three-dimensional visualization of the Persian Gulf mine threat zone is shown in each of FIG. 4 and FIG. 5. The gray shaded versions of FIG. 4 and FIG. 5 are equivalent to the colored versions of APPENDIX D and APPENDIX E, respectively. As illustrated in FIG. 4 (and, equally, in APPENDIX D), the safe-depth is 100 feet. The same geographical area is shown in FIG. 5 (and, equally, in APPENDIX E), but with a safe-depth of 200 feet. Note the greatly reduced safe navigation area of FIG. 5 vis-a-vis' FIG. 4.

In each of FIG. 2 through FIG. 5, the contrasting mine threat zone(s) and mine safety zone(s) are shown to be associated with one safe-depth. Three contrasting colors (portrayed in variously shaded "black-and-white" colors in FIG. 2 through FIG. 5 and in variously hued "color" colors in APPENDIX B through APPENDIX E) are used. The term "color" is herein in the broadest sense; two entities are characterized by different colors if they are characterized by differing qualities of light as reflected or emitted thereby or as perceived by a human observer. For instance, red, blue and green can be considered to be three different colors; also, a dark gray shade, a medium gray shade and a light gray shade can be considered to be three different colors.

According to many inventive applications, a single safe-depth is considered. The displays depicted in FIG. 2 through FIG. 5 are illustrative of inventive practice involving displays premised upon one safe-depth. Generally, for single safe-depths, when the inventive practitioner selects a region (e.g., by entering longitudinal and latitudinal information, and/or by entering a pre-programmed region) for consideration of water mine threat, the map which is displayed on the computer screen (perhaps a preliminary two-dimensional map, or a rotatable three-dimensional map) may exhibit any of seven combinations of three mine zone types, viz., (I) "insignificant" water mine threat (i.e., mine safety zone), (F) "significant" water mine threat (i.e., mine threat zone) and (N) "nonexistent" water mine threat (i.e., land mass). The seven combinations of zone types are as follows: (i) I; (ii) F; (iii) N; (iv) I+F; (v) I+N; (vii) F+N; (vii) I+F+N. In cases (i), (ii) and (iii), a single zone type is displayed on the map; hence, in inventive practice, there is typically no manifestation of contrast, at least as pertains to water mine threat. In cases (iv), (v), (vi) and (vii), since there are plural zone types, some manifestation of contrast between/among zone types is generally necessary in inventive practice. In cases (iv), (v) and (vi), two zone types are contrastingly shown with respect to each other; that is, there a two clearly distinguishable visual manifestations in terms of color and/or pattern, each pertaining to a different zone type. In case (vii), three zone types are contrastingly shown with respect to each other; that is, there a three clearly distinguishable visual manifestations in terms of color and/or pattern, each pertaining to a different zone type.

The present invention is partially predicated on the fact that the vast majority of underwater mines are relatively closely anchored, moored or otherwise secured with respect to the bottom (bed) of a body of water. An underwater mine's triggering mechanism, designed for contact with or influence by a marine vehicle, will generally be situated proximate its securement location at the sea bed (water bottom). In accordance with the physical principles of buoyancy, the underwater mine will be approximately vertically disposed in relation to this point of attachment to the sea bed. Normally, an underwater mine will not be tethered extensively so as to be positioned a great distance above the sea bed. Therefore, according to inventive principles, the definition of a "safe-depth" (as a depth below which, for all intents and purposes, the actual threat of an underwater mine is minimal) is coupled with the assumption that, at any given locale of a sea bed, the sea bed depth is approximately or nearly representative of (e.g., only slightly greater than) the depth of the underwater mine threat associated therewith.

In inventive practice, the maximum anticipated length of a prospective underwater mine tether can be incorporated into the safe-depth definition. In this regard, it may be useful to mentally distinguish between what is styled herein the "true" safe-depth (which is defined herein in terms of the depth of the underwater mine's explosive actuation mechanism) and what is styled herein the "adjusted" safe-depth (which is defined herein in terms of the water depth, i.e., the sea bed depth, vertically below the underwater mine's explosive actuation mechanism). For instance, if a true safe-depth for a particular ship type is x feet, but a prospective underwater mine is potentially situated at a vertical distance as great as y feet from its sea bed base location, then the adjusted safe-depth for inventive purposes is x+y. In other words, the true safe-depth is defined as the maximum depth of the mine under consideration at which such mine ceases to fire on the vessel's signature. The adjusted safe-depth is defined as the maximum depth of the sea bed, beneath the mine under consideration, at which such mine ceases to fire on the vessel's signature.

An underwater mine which is below the true safe-depth is deep enough that, as a practical matter, it will be too deep to adversely affect the kind(s) of marine vessels which is (are) contemplated for navigating such waters. A sea bed portion which is below the adjusted safe-depth is deep enough that, as a practical matter, any underwater mine associated therewith will be too deep to adversely affect the kind(s) of marine vessels which is (are) contemplated for navigating such waters. What constitutes the particular safe-depth, "true" or "adjusted," for given circumstances may depend, at least in part, on the types and characteristics of the marine vessel(s) (e.g., ship, submarine, size, shape, magnetic signature, acoustic signature, etc.) and the underwater mines (contact, influence, magnetic, acoustic, etc.) which are expected to travel or situate in the vicinity in question. The distinction between "true" safe-depth and "adjusted" safe-depth is made herein only as conceptually significant insofar as the inventive practitioner should be aware of various pertinent considerations when selecting the safe-depth value or values in the context of inventive practice.

Some inventive embodiments may have to account for the eventuality wherein the defined safe-depth (e.g., adjusted safe-depth), such as would be inventively programmed, is exactly matched by a particular sea bed depth inventively obtained from a geographical database. In other words, a particular section of the sea bed may happen to be located at a depth which, according to the geographical database being inventively implemented, precisely equals the designated safe-depth. It would depend on the inventive embodiment whether "tie" zones (i.e., wherein the water depth equals the safe depth) are designated "safe" zones (wherein the water depth is deemed to be below the safe-depth) or "unsafe" zones (wherein the water depth is deemed to be above the safe-depth).

It is emphasized that, according to many embodiments of this invention, a single safe-depth is implemented (typically corresponding to a single marine vessel). For instance, if a specific type of ship is planned for navigation of a specific marine region, an inventive practitioner will enter a single safe-depth value into an inventive computer program. As shown in each of FIG. 2 through FIG. 5, one contrasting color signifies one or more land masses. In addition, one pair of contrasting colors is used to signify mine threat versus mine safety in one or more water areas; that is, the mine threat zone or zones are depicted as characterized by one color, and the mine safety zone or zones are depicted as characterized by another color.

Some inventive embodiments provide for effectuation of plural safe-depth values wherein each safe-depth value corresponds to its own particular circumstances. In other words, the present invention can allow for plural safe-depths which entail plural sets of mine threat zones and mine safety zones, wherein each safe-depth has its own corresponding set of mine threat zones and mine safety zones. For example, an inventive practitioner may wish to establish degees or gradations of mine threat, e.g., in terms of severe, moderate, slight, etc. As another example, an inventive practitioner may wish to visualize, on the same display screen and in relation to the confines of the same geographical area, mine threat zones and mine safety zones pertaining to two or more different classes of ships and/or two or more different kinds of mines. For such inventive purposes, plural color-coded mine threat zones (e.g., red, orange, yellow, etc.) and plural color-coded mine safety zones (e.g., blue, purple, brown, etc.) could be displayed whereby, for instance: red signifies mine threat zone for a first safe-depth; blue signifies mine safety zone for the first safe-depth; orange signifies mine threat zone for a second safe-depth; purple signifies mine safety zone for the second safe-depth; yellow signifies mine threat zone for a third safe-depth; brown signifies mine safety zone for the third safe-depth; and so on. However, since there logically would be one or more "intersections" of mine threat zones or mine safety zones, an appropriate contrasting scheme would need to be established by the inventive practitioner, perhaps utilizing both colors and patterns. It is inventively practicable to implement a contrasting scheme wherein, for plural safe-depths, every mine threat zone and mine safety zone corresponding to every safe-depth is individually represented using a suitable contrasting scheme.

It is pointed out that, according to inventive practice, contrast between areas of an inventive visual display can be achieved in any of various ways. Not only can contrasting colors be used, as illustrated in FIG. 2 through FIG. 5 and in APPENDIX B through APPENDIX E, but also contrasting patterns of any of diverse sorts and configurations (e.g., solid, dotted, cross-hatched, etc.) can be used. In fact, combinations of disparite colors and patterns can be used according to this invention. Such combinations of solids and/or patterns may be especially useful for practicing plural safe-depth embodiments of this invention. For instance, suppose an area is colored red, thereby signifying mine threat for a certain kind of ship; a portion of this red area can be patterned rather than solid, signifying mine safety for another kind of ship. The ordinarily skilled artisan who reads the instant disclosure will, in inventive practice, be able to achieve the requisite nature and degree of contrast between and among plural displayed areas. According to generally preferred inventive practice, the intended distinctions between zones should be readily appreciable to the naked human eye.

As mentioned hereinabove, some inventive embodiments provide for visualization of plural (e.g., multiple) mine threat-versus-safety color schemes, in addition to visualization of one or more land masses (if any land masses are present in the considered geographical region). According to plural safe-depth embodiments of this invention, each safe-depth has corresponding thereto its own pair of marine zone characteristics, viz., unsafe (threat) and safe. For instance, each safe depth can pertain to a different condition or set of conditions, e.g., a different type of marine vessel and/or to a different type of underwater mine. Logically speaking, the various mine threat territories and mine safety territories are not mutually exclusive. In other words, one or more zones may represent mine threat relating to each of two or more safe-depths, and one or more zones may represent mine safety relating to each of two or more safe-depths. For plural safe-depth embodiments, it may be advantagious to use patterns; however, patterns need not be employed. A rational diversity can be applied to color schemes strictly involving solid colors. A scheme of patterns coupled with or superimposed on colors may prove to be more informative or more readily interpreted than a scheme of merely solid colors in terms of differentiating between and among mine threat zones and mine safety zones corresponding to different safe-depths.

Nevertheless, many plural safe-depth embodiments of this invention lend themselves to utilization of either (a) contrasting solid colors plus patterns or (b) contrasting solid colors sans patterns or (c) contrasting patterns. For example, it may be understood by the inventive practitioner that a particular zone type represents mine threat in relation to a particular kind of ship, that another particular zone type represents mine threat in relation to another particular kind of ship, and that yet another particular zone type represents mine threat in relation to either of two kinds of ships. For instance, let us assume that ship "A" has a safe-depth of 127 feet, and ship "B" has a safe-depth of 193 feet. The inventive practitioner realizes that a mine threat zone for ship "B" will not necessarily constitute a mine threat zone for ship "A," and that a mine safety zone for ship "A" will not necessarily constitute a mine safety zone for ship "B." In other words, as compared with ship "A," ship "B" will have a larger mine threat zone area and a smaller mine safetly zone area. Under these circumstances, it can be considered that there are three categories of marine zones that can be inventively displayed, viz., (i) wherein the water depth is less than 127 feet; (ii) wherein the water depth is between 127 feet and 193 feet; and, (iii) wherein the water depth is greater than 193 feet. A water depth of less than 127 feet will pose a mine threat to both ship "A" and ship "B"—that is, will constitute a mine threat zone as to either ship "A" or ship "B," but will not constitute a mine safety zone as to either ship "A" or ship "B"; this "conjunctive" mine threat zone can be represented by a first color, say, the color red. A water depth of greater than 127 feet but less than 193 feet will pose a mine threat to ship "B" but not to ship "A"—that is, will constitute a mine threat zone as to ship "B," but a mine safety zone as to ship "A"; this "disjunctive" mine threat zone can be represented by a second color, say, the color orange. A water depth of greater than 193 feet will pose a mine threat to neither ship "A" nor ship "B"—that is, will constitute a mine safety zone as to either ship "A" and ship "B"; this mine safety zone can be represented by a third color, say, the color blue.

Similar logic can be applied when mine threats to three ships (e.g., ship "A," ship "B" and ship "C") having three different safe-depths are being inventively displayed. Under the circumstances of three different safe-depths (say, 127 feet for ship "A," 193 feet for ship "B," 239 feet for ship "C'), four types of zones can be identified, namely: (i) less than 127 feet, which constitutes mine threat as to ship "A," ship "B' and ship "C"; (ii) greater than 127 feet but less than 193 feet, which constitutes mine threat as to either ship "B" or ship "C," but mine safety as to ship "A"; (iii) greater than 193 feet but less than 239 feet, which constitutes mine threat as to ship "C," but mine safety as to either ship "A" or ship "B"; (iv) greater than 239 feet, which constitutes mine threat as to neither ship "A" nor ship "B" nor ship C" (i.e., mine safety as to all three ships). According to an inventive embodiment of this nature, zone "(i)" can be represented by a first color (e.g., red), zone "(ii)" can be represented by a second color (e.g., orange), zone "(iii)" can be represented by a third color (e.g., yellow), and zone "(iv)" can be represented by a fourth color (e.g., blue). Inventive reasoning along similar lines can be applied to any number of zone types. Generally according to this invention, for s number of safe-depths to be shown in a single display, the number of marine zone types represented will be s+1. This number (s+1) is exclusive of the land mass zone type. In other words, typically according to the present invention, in association with s safe-depths there will be s plus one marine zone types and one land mass zone type.

Shipboard applications are among the most propitious of the present invention. During shipboard use, Global Positioning System (GPS) information can be read by the inventive program, and ship location can be indicated in the two-dimensional preview display and/or in the three-dimensional visualization. Further, the present invention can be practiced as, as part of, or in the context of a shipboard alarm system. For instance, an audible alarm can be sounded, and/or a visual alarm flashed, if the safe-depth exceeds the water depth at a particular ship location.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

APPENDIX A ( Not print )

```
// ThreatZone.cpp : implementation file
// include "stdafx.h"
include "OpenGL.h"
#include "ThreatZone.h"
#include "TSignature.h"

#ifdef _DEBUG
#define new DEBUG_NEW
#undef THIS_FILE
static char THIS_FILE[] = __FILE__;
endif /////////////////////////////////////////////////////////////////////////////
// CThreatZone dialog CThreatZone::CThreatZone(CWnd* pParent /*=NULL*/)
        : CDialog(CThreatZone::IDD, pParent)
{
        m_South = 0;
        m_North = 1;
        m_East = 1;
        m_West = 0;

m_Loc = 0; // persian gulf default m_Topo = NULL; // set topo pointer to null
        m_SafeDepth = 100;

//{{AFX_DATA_INIT(CThreatZone)
        m_Lat1 = 0;
        m_Lat2 = 0;
        m_Long1 = 0;
        m_Long2 = 0;
        m_SafeDepth = 0;
        //}}AFX_DATA_INIT
}

CThreatZone::~CThreatZone()
{
        if (m_Topo) // delete m_Topo if it exists
        {
                delete m_Topo;
                m_Topo = NULL;
        }
} void CThreatZone::DoDataExchange(CDataExchange* pDX)
{
        CDialog::DoDataExchange(pDX);
        //{{AFX_DATA_MAP(CThreatZone)
```

A-1

```
            DDX_Text(pDX, IDC_Lat1, m_Lat1);
            DDV_MinMaxInt(pDX, m_Lat1, 0, 90);
            DDX_Text(pDX, IDC_Lat2, m_Lat2);
            DDV_MinMaxInt(pDX, m_Lat2, 0, 90);
            DDX_Text(pDX, IDC_Long1, m_Long1);
            DDV_MinMaxInt(pDX, m_Long1, 0, 180);
            DDX_Text(pDX, IDC_Long2, m_Long2);
            DDV_MinMaxInt(pDX, m_Long2, 0, 180);
            DDX_Text(pDX, IDC_SafeDepth, m_SafeDepth);
            DDV_MinMaxInt(pDX, m_SafeDepth, 0, 5000);
            //}}AFX_DATA_MAP
}

BEGIN_MESSAGE_MAP(CThreatZone, CDialog)
        //{{AFX_MSG_MAP(CThreatZone)
        ON_BN_CLICKED(IDC_North, OnNorth)
        ON_BN_CLICKED(IDC_South, OnSouth)
        ON_BN_CLICKED(IDC_West, OnWest)
        ON_BN_CLICKED(IDC_East, OnEast)
        ON_BN_CLICKED(IDC_HobartTasmania, OnHobartTasmania)
        ON_BN_CLICKED(IDC_Korea, OnKorea)
        ON_BN_CLICKED(IDC_MalaccaStrait, OnMalaccaStrait)
        ON_BN_CLICKED(IDC_Murmansk, OnMurmansk)
        ON_BN_CLICKED(IDC_PersianGulf, OnPersianGulf)
        ON_BN_CLICKED(IDC_RioDeJaneiro, OnRioDeJaneiro)
        ON_BN_CLICKED(IDC_TaiwanStrait, OnTaiwanStrait)
        ON_WM_PAINT()
        ON_BN_CLICKED(IDC_Apply, OnApply)
        //}}AFX_MSG_MAP
END_MESSAGE_MAP()

/////////////////////////////////////////////////////////////////////////////
// CThreatZone message handlers BOOL CThreatZone::OnInitDialog()
{
        CDialog::OnInitDialog();

// TODO: Add extra initialization here

// setup location button
        SetLocationButton();

// default to persian gulf
        m_Lat1 = 31; m_Lat2 = 23;
        m_Long1 = 47; m_Long2 = 61;
        m_East = 1; m_West = 0; m_North = 1; m_South = 0;
        SetLatLong();
        SetLatLongButtons();

// set up safe depth box
        CString myText;
        CEdit* depth = (CEdit*) GetDlgItem(IDC_SafeDepth);
        myText.Format("%d",m_SafeDepth); depth->SetWindowText(myText);
```

A-2

```
        // read the elevations
        ReadWorldMap();

return TRUE;   // return TRUE unless you set the focus to a control
                       // EXCEPTION: OCX Property Pages should return FALSE
} void CThreatZone::ReadWorldMap()
{
        FILE *fp;
        char *infile = "c:/etopo5.dos";

if ((fp = fopen(infile, "r+b")) == NULL)
        {
                AfxMessageBox("Topography database not found.");
                return;
        }

// grab some data
        short latitude[4320];
        int bytesPerLat(8640);
        int L, status;

int lat1, lat2, lon1, lon2, latExtent, lonExtent;

int latDeg1(0), latMin1(0), lonDeg1(0), lonMin1(0);
        int latDeg2(0), latMin2(0), lonDeg2(0), lonMin2(0);

latDeg1 = m_Lat1; latDeg2 = m_Lat2;
        lonDeg1 = m_Long1; lonDeg2 = m_Long2;

// assume for now, that longitude is given all east or all west,
        // and latitude is given all north or all south.
        // convert lat and long degrees from chart to database.
        if (m_West)
        {
                if (lonDeg1 < lonDeg2)
                { // switch
                        int temp = lonDeg1;
                        lonDeg1 = lonDeg2;
                        lonDeg2 = temp;
                }
                lonDeg1 = 360 - lonDeg1;
                lonDeg2 = 360 - lonDeg2;
        }
        if (m_North)
        {
                latDeg1 = 90 - latDeg1;
                latDeg2 = 90 - latDeg2;
        }
        if (m_South)
        {
                latDeg1 = 90 + latDeg1;
                latDeg2 = 90 + latDeg2;
        }
        // for now, we don't handle the case where wraparound over 0 long occurs
```

```
// determine location of the patch of earth's surface to recover
// for now, use 0 degrees for north pole lat, 180 deg for south pole lat
// 0 for england long, then long goes east and wraps around to 355 deg 55 min
// that is the database coordinates
lat1 = latDeg1*12 + latMin1/5;
lat2 = latDeg2*12 + latMin2/5;
lon1 = lonDeg1*12 + lonMin1/5;
lon2 = lonDeg2*12 + lonMin2/5;
latExtent = (lat2 - lat1) + 1;
if (lon1 > lon2)
{
        lonExtent = (8640/2) - lon1;
        lonExtent = lonExtent + lon2 + 1;
}
else
{
        lonExtent = (lon2 - lon1) + 1;
}

// rewind the file
fseek(fp,0L,0);
// position to starting latitude
if (fseek(fp, lat1 * bytesPerLat, 0) != 0)
{
        AfxMessageBox("Error positioning topography database.");
        fclose(fp);
        return;
}

// set up the topo signature to receive the data
if (m_Topo) { delete m_Topo; m_Topo = NULL; }
// make latitude twice as wide as longitude
m_Topo = new TSignature( float(lonExtent/2),float(-lonExtent/2),-1,
                        float(latExtent/2),float(-latExtent/2),-1.f, 0.f);

// read elevations
for (int i = 0; i < m_Topo->fNpro; i++)
{
        L = fread(&latitude, 1, bytesPerLat, fp);
        status = ferror(fp);
        if (status != 0)
        {
                fclose(fp);
                AfxMessageBox("Error reading topography database.");
                return;
        }
        // good read, extract data points
        for (int j = 0; j < m_Topo->fNpts; j++)
        {
                m_Topo->fZSig[i][j] = latitude[lon1+j];
        }
}

CString myText;
myText.Format("lat1: %d, lat2: %d, lon1: %d, lon2: %d, latExt: %d, lonExt: %d",
```

```
                lat1, lat2, lon1, lon2, latExtent, lonExtent);
        //AfxMessageBox(myText);

fclose(fp);
} void CThreatZone::DisplayMap(CPaintDC *dc)
{
        int xOff(180), yOff(230), z(0);
        int xH(m_Topo->fNpro/2), yH(m_Topo->fNpts/2);
        int t = int(-(float(m_SafeDepth)/3.2808f));  // convert feet to meters
        COLORREF rgb;

for (int i = 0; i < m_Topo->fNpro; i++)
        {
                for (int j = 0; j < m_Topo->fNpts; j++)
                {
                        z = (int)m_Topo->fZSig[i][j];

if (z > 0)
                        {
                                rgb = RGB(51,150,51);
                        }
                        //else if (z < 0 && z > -m_SafeDepth)
                        if (z < 0)
                        {
                                rgb = RGB(250,51,51);
                        }
                        if (z < t)
                        {
                                rgb = RGB(51,51,179);
                        }
                        dc->SetPixel(yOff-yH+j,xOff-xH+i,rgb);
                }
        }
} void CThreatZone::SetLocationButton()
{
        CButton* persianGulf = (CButton*)GetDlgItem(IDC_PersianGulf);
        CButton* korea = (CButton*)GetDlgItem(IDC_Korea);
        CButton* taiwanStrait = (CButton*)GetDlgItem(IDC_TaiwanStrait);
        CButton* malaccaStrait = (CButton*)GetDlgItem(IDC_MalaccaStrait);
        CButton* murmansk = (CButton*)GetDlgItem(IDC_Murmansk);
        CButton* rio = (CButton*)GetDlgItem(IDC_RioDeJaneiro);
        CButton* hobart = (CButton*)GetDlgItem(IDC_HobartTasmania);

// turn off the buttons
        persianGulf->SetCheck(FALSE);
        korea->SetCheck(FALSE);
        taiwanStrait->SetCheck(FALSE);
        malaccaStrait->SetCheck(FALSE);
        murmansk->SetCheck(FALSE);
        rio->SetCheck(FALSE);
        hobart->SetCheck(FALSE);
```

```
        // turn on selected location button
        if (m_Loc == 0) persianGulf->SetCheck(TRUE);
        if (m_Loc == 1) korea->SetCheck(TRUE);
        if (m_Loc == 2) taiwanStrait->SetCheck(TRUE);
        if (m_Loc == 3) malaccaStrait->SetCheck(TRUE);
        if (m_Loc == 4) murmansk->SetCheck(TRUE);
        if (m_Loc == 5) rio->SetCheck(TRUE);
        if (m_Loc == 6) hobart->SetCheck(TRUE);
} void CThreatZone::SetLatLong()
{
        // setup coordinate boxes
        CEdit* lat1 = (CEdit*) GetDlgItem(IDC_Lat1);
        CEdit* lat2 = (CEdit*) GetDlgItem(IDC_Lat2);
        CEdit* long1 = (CEdit*) GetDlgItem(IDC_Long1);
        CEdit* long2 = (CEdit*) GetDlgItem(IDC_Long2);

CString myText;
        myText.Format("%d",m_Lat1); lat1->SetWindowText(myText);
        myText.Format("%d",m_Lat2); lat2->SetWindowText(myText);
        myText.Format("%d",m_Long1); long1->SetWindowText(myText);
        myText.Format("%d",m_Long2); long2->SetWindowText(myText);
} void CThreatZone::SetLatLongButtons()
{
        CButton* east = (CButton*)GetDlgItem(IDC_East);
        CButton* west = (CButton*)GetDlgItem(IDC_West);
        CButton* north = (CButton*)GetDlgItem(IDC_North);
        CButton* south = (CButton*)GetDlgItem(IDC_South);

// reset buttons
        east->SetCheck(FALSE);
        west->SetCheck(FALSE);
        north->SetCheck(FALSE);
        south->SetCheck(FALSE);

// setup radio buttons
        if (m_East) east->SetCheck(TRUE);
        if (m_West) west->SetCheck(TRUE);
        if (m_North) north->SetCheck(TRUE);
        if (m_South) south->SetCheck(TRUE);
} void CThreatZone::GetLatLong()
{
        CEdit* lat1 = (CEdit*) GetDlgItem(IDC_Lat1);
        CEdit* lat2 = (CEdit*) GetDlgItem(IDC_Lat2);
        CEdit* long1 = (CEdit*) GetDlgItem(IDC_Long1);
        CEdit* long2 = (CEdit*) GetDlgItem(IDC_Long2);

CString myText;

lat1->GetWindowText(myText);
```

```
            m_Lat1 = atoi(myText.GetBuffer(20));
            lat2->GetWindowText(myText);
            m_Lat2 = atoi(myText.GetBuffer(20));

long1->GetWindowText(myText);
            m_Long1 = atoi(myText.GetBuffer(20));
            long2->GetWindowText(myText);
            m_Long2 = atoi(myText.GetBuffer(20));
} void CThreatZone::OnNorth()
{
            // TODO: Add your control notification handler code here
            CButton* north = (CButton*)GetDlgItem(IDC_North);
            CButton* south = (CButton*)GetDlgItem(IDC_South);

m_North = 1; m_South = 0;

if (m_North) north->SetCheck(TRUE); else north->SetCheck(FALSE);
            if (m_South) south->SetCheck(TRUE); else south->SetCheck(FALSE);
} void CThreatZone::OnSouth()
{
            // TODO: Add your control notification handler code here
            CButton* north = (CButton*)GetDlgItem(IDC_North);
            CButton* south = (CButton*)GetDlgItem(IDC_South);

m_North = 0; m_South = 1;

if (m_North) north->SetCheck(TRUE); else north->SetCheck(FALSE);
            if (m_South) south->SetCheck(TRUE); else south->SetCheck(FALSE);
} void CThreatZone::OnWest()
{
            // TODO: Add your control notification handler code here
            CButton* east = (CButton*)GetDlgItem(IDC_East);
            CButton* west = (CButton*)GetDlgItem(IDC_West);

m_West = 1; m_East = 0;

if (m_West) west->SetCheck(TRUE); else west->SetCheck(FALSE);
            if (m_East) east->SetCheck(TRUE); else east->SetCheck(FALSE);
} void CThreatZone::OnEast()
{
            // TODO: Add your control notification handler code here
            CButton* east = (CButton*)GetDlgItem(IDC_East);
            CButton* west = (CButton*)GetDlgItem(IDC_West);

m_West = 0; m_East = 1;

if (m_West) west->SetCheck(TRUE); else west->SetCheck(FALSE);
            if (m_East) east->SetCheck(TRUE); else east->SetCheck(FALSE);
```

```
} void CThreatZone::GetSafeDepth()
{
        CEdit* depth = (CEdit*) GetDlgItem(IDC_SafeDepth);
        CString myText;

depth->GetWindowText(myText);
        m_SafeDepth = atoi(myText.GetBuffer(20));
} void CThreatZone::OnHobartTasmania()
{
        // TODO: Add your control notification handler code here
        m_Loc = 6;
        SetLocationButton();
        m_Lat1 = 30; m_Lat2 = 45;
        m_Long1 = 134; m_Long2 = 154;
        m_East = 1; m_West = 0; m_North = 0; m_South = 1;
        SetLatLong();
        SetLatLongButtons();

GetSafeDepth();
        ReadWorldMap();
        Invalidate();
} void CThreatZone::OnKorea()
{
        // TODO: Add your control notification handler code here
        m_Loc = 1;
        SetLocationButton();
        m_Lat1 = 40; m_Lat2 = 33;
        m_Long1 = 124; m_Long2 = 131;
        m_East = 1; m_West = 0; m_North = 1; m_South = 0;
        SetLatLong();
        SetLatLongButtons();

GetSafeDepth();
        ReadWorldMap();
        Invalidate();
} void CThreatZone::OnMalaccaStrait()
{
        // TODO: Add your control notification handler code here
        m_Loc = 3;
        SetLocationButton();
        m_Lat1 = 10; m_Lat2 = 0;
        m_Long1 = 94; m_Long2 = 108;
        m_East = 1; m_West = 0; m_North = 1; m_South = 0;
        SetLatLong();
        SetLatLongButtons();

GetSafeDepth();
        ReadWorldMap();
```

A-8

```
            Invalidate();
} void CThreatZone::OnMurmansk()
{
            // TODO: Add your control notification handler code here
            m_Loc = 4;
            SetLocationButton();
            m_Lat1 = 75; m_Lat2 = 67;
            m_Long1 = 24; m_Long2 = 40;
            m_East = 1; m_West = 0; m_North = 1; m_South = 0;
            SetLatLong();
            SetLatLongButtons();

GetSafeDepth();
            ReadWorldMap();
            Invalidate();
} void CThreatZone::OnPersianGulf()
{
            // TODO: Add your control notification handler code here
            m_Loc = 0;
            SetLocationButton();
            m_Lat1 = 31; m_Lat2 = 23;
            m_Long1 = 47; m_Long2 = 61;
            m_East = 1; m_West = 0; m_North = 1; m_South = 0;
            SetLatLong();
            SetLatLongButtons();

GetSafeDepth();
            ReadWorldMap();
            Invalidate();
} void CThreatZone::OnRioDeJaneiro()
{
            // TODO: Add your control notification handler code here
            m_Loc = 5;
            SetLocationButton();
            m_Lat1 = 20; m_Lat2 = 25;
            m_Long1 = 48; m_Long2 = 40;
            m_East = 0; m_West = 1; m_North = 0; m_South = 1;
            SetLatLong();
            SetLatLongButtons();

GetSafeDepth();
            ReadWorldMap();
            Invalidate();
} void CThreatZone::OnTaiwanStrait()
{
            // TODO: Add your control notification handler code here
            m_Loc = 2;
            SetLocationButton();
```

A-9

```
        m_Lat1 = 30; m_Lat2 = 20;
        m_Long1 = 113; m_Long2 = 123;
        m_East = 1; m_West = 0; m_North = 1; m_South = 0;
        SetLatLong();
        SetLatLongButtons();

GetSafeDepth();
        ReadWorldMap();
        Invalidate();
} void CThreatZone::OnPaint()
{
        CPaintDC dc(this); // device context for painting // TODO: Add your message handler code here
        //AfxMessageBox("OnPaint called.");

DisplayMap(&dc);

// Do not call CDialog::OnPaint() for painting messages
} void CThreatZone::OnApply()
{
        // TODO: Add your control notification handler code here
        GetLatLong();
        GetSafeDepth();
        ReadWorldMap();
        Invalidate();
} void CMyView::DisplayTopography(TSignature *pSig)
{
        // display a 3d surface from a patch of the earths topography in a signature.

float x1, y1, z1, x2, y2, z2, z3, z4;
        float sx1, sy1, sz1, sx2, sy2, sz2, sz3, sz4; // scaled to plot
        glEnable(GL_LIGHTING);

// set up for picking
        glInitNames();
        glPushName(0);
        glLoadName(10000); // name for picking // try quads for now
        float norm[3], p0[3], p1[3], p2[3];

GLfloat sigColor[3] = { 0.2f, 0.2f, 0.2f };

// enable material color with lighting
        glEnable(GL_COLOR_MATERIAL);
        glColorMaterial(GL_FRONT, GL_AMBIENT_AND_DIFFUSE);
```

```
// ok, we need to get vertical and horizontal scale in same units
// right now, the data is in meters vertically, and horizontally in degrees
// so, we need to find either lat or long distance in meters and
// use this to convert to meters horizontally
float hScale, vScale;
// elevation is in meters, there are 3.2808 ft/m
// compute the distance in feet from lat and long
float earth_radius = 6367000.f;
float dlon = float(fabs(m_long2 - m_long1));
float dlat = 0.f; //float(fabs(m_lat2 - m_lat1));
// convert degrees to radians
dlon = dlon * 3.14159265f/180.f;
dlat = dlat * 3.14159265f/180.f;
// compute distance using radians
float a = (sin(dlat/2)*sin(dlat/2))
        + cos(m_lat1*3.14159265f/180.f) * cos(m_lat2*3.14159265f/180.f)
        * (sin(dlon/2)*sin(dlon/2));
float d = 2.f * atan2(sqrt(a), sqrt(1-a)) * earth_radius;

float amp(.00001);
hScale = amp * d / pSig->fNpts; // meters/point
vScale = amp * 1.f;

float thresh1(0), thresh2(-100);
thresh2 = -(float)fabs(float(m_safeDepth))/3.2808f; // convert feet to meters
y1 = pSig->fYStart;
y2 = y1 + pSig->fYInc;
for (int j = 0; j < pSig->fNpro - 1; j++)
{
        x1 = pSig->fXStart;
        x2 = x1 + pSig->fXInc;
        for (int n = 0; n < pSig->fNpts - 1; n++)
        {
                z1 = pSig->fZSig[j][n];
                z2 = pSig->fZSig[j+1][n];
                z3 = pSig->fZSig[j+1][n+1];
                z4 = pSig->fZSig[j][n+1];

sx1 = x1 * hScale; sx2 = x2 * hScale;
                sy1 = y1 * hScale; sy2 = y2 * hScale;
                sz1 = z1 * vScale; sz2 = z2 * vScale;
                sz3 = z3 * vScale; sz4 = z4 * vScale;

p1[0] = sx1; p1[1] = sz1; p1[2] = sy1;
                p0[0] = sx1; p0[1] = sz2; p0[2] = sy2;
                p2[0] = sx2; p2[1] = sz3; p2[2] = sy2;
                NormalVector(p0,p1,p2,norm);
                glBegin(GL_QUADS);
                        glNormal3f(norm[0],norm[1],norm[2]);
                        //glColor4f(.9f,.2f,.2f,.5f); // mined area
                        glColor4f(.9f,.1f,.2f,.5f); // mined area for mike
                        if (z1 > thresh1 || z2 > thresh1 || z3 > thresh1 || z4 > thresh1)
                                //glColor4f(.2f,.7f,.2f,.5f); // land, thankyou
                                glColor4f(.7f,.7f,.8f,.5f); // land for mike
                        if (z1 < thresh2 && z2 < thresh2 && z3 < thresh2 && z4 < thresh2)
                                //glColor4f(.2f,.2f,.7f,.5f); // safe zone
```

```
                    glColor4f(.2f,.8f,.4f,.5f); // safe zone for mike (green)
                    glVertex3f(sx1, sz1, sy1); // y is up!
                    glVertex3f(sx1, sz2, sy2); // y is up!
                    glVertex3f(sx2, sz3, sy2); // y is up!
                    glVertex3f(sx2, sz4, sy1); // y is up!
                glEnd();
                x1 += pSig->fXInc;
                x2 += pSig->fXInc;
            }
            y1 += pSig->fYInc;
            y2 += pSig->fYInc;
        }

// turn off color material lighting
        glDisable(GL_COLOR_MATERIAL);
} void CMyView::DisplayTopography(TSignature *pSig)
{
        // display a 3d surface from a patch of the earths topography in a signature.

float x1, y1, z1, x2, y2, z2, z3, z4;
        float sx1, sy1, sz1, sx2, sy2, sz2, sz3, sz4; // scaled to plot
        glEnable(GL_LIGHTING);

// set up for picking
        glInitNames();
        glPushName(0);
        glLoadName(10000); // name for picking // try quads for now
        float norm[3], p0[3], p1[3], p2[3];

GLfloat sigColor[3] = { 0.2f, 0.2f, 0.2f };

// enable material color with lighting
        glEnable(GL_COLOR_MATERIAL);
        glColorMaterial(GL_FRONT, GL_AMBIENT_AND_DIFFUSE);

// ok, we need to get vertical and horizontal scale in same units
        // right now, the data is in meters vertically, and horizontally in degrees
        // so, we need to find either lat or long distance in meters and
        // use this to convert to meters horizontally
        float hScale, vScale;
        // elevation is in meters, there are 3.2808 ft/m
        // compute the distance in feet from lat and long
        float earth_radius = 6367000.f;
        float dlon = float(fabs(m_long2 - m_long1));
        float dlat = 0.f; //float(fabs(m_lat2 - m_lat1));
        // convert degrees to radians
        dlon = dlon * 3.14159265f/180.f;
        dlat = dlat * 3.14159265f/180.f;
        // compute distance using radians
        float a = float( (sin(dlat/2)*sin(dlat/2))
                + cos(m_lat1*3.14159265f/180.f) * cos(m_lat2*3.14159265f/180.f)
                * (sin(dlon/2)*sin(dlon/2)) );
```

```
float d = 2.f * (float)atan2(sqrt(a), sqrt(1-a)) * earth_radius;

float amp(.00002f);
hScale = amp * d / pSig->fNpts; // feet/point
hScale = hScale / 3.2808f; // meters/point
vScale = amp * 1.f; // vertical elevation is already in meters float thresh1(0), thresh2(-100);
thresh2 = -(float)fabs(float(m_safeDepth))/3.2808f; // convert feet to meters
y1 = pSig->fYStart;
y2 = y1 + pSig->fYInc;
for (int j = 0; j < pSig->fNpro - 1; j++)
{
        x1 = pSig->fXStart;
        x2 = x1 + pSig->fXInc;
        for (int n = 0; n < pSig->fNpts - 1; n++)
        {
                z1 = pSig->fZSig[j][n];
                z2 = pSig->fZSig[j+1][n];
                z3 = pSig->fZSig[j+1][n+1];
                z4 = pSig->fZSig[j][n+1];

sx1 = x1 * hScale; sx2 = x2 * hScale;
                sy1 = y1 * hScale; sy2 = y2 * hScale;
                sz1 = z1 * vScale; sz2 = z2 * vScale;
                sz3 = z3 * vScale; sz4 = z4 * vScale;

p1[0] = sx1; p1[1] = sz1; p1[2] = sy1;
                p0[0] = sx1; p0[1] = sz2; p0[2] = sy2;
                p2[0] = sx2; p2[1] = sz3; p2[2] = sy2;
                NormalVector(p0,p1,p2,norm);
                glBegin(GL_QUADS);
                        glNormal3f(norm[0],norm[1],norm[2]);
                        //glColor4f(.9f,.2f,.2f,.5f); // mined area
                        //glColor4f(.9f,.1f,.2f,.5f); // mined area for mike
                        glColor4f(.3f,.3f,.3f,.5f); // mined area greyscale
                        if (z1 > thresh1 || z2 > thresh1 || z3 > thresh1 || z4 > thresh1)
                                //glColor4f(.2f,.7f,.2f,.5f); // land, thankyou
                                //glColor4f(.7f,.7f,.8f,.5f); // land for mike
                                glColor4f(.7f,.7f,.7f,.5f); // land greyscale
                        if (z1 < thresh2 && z2 < thresh2 && z3 < thresh2 && z4 < thresh2)
                                //glColor4f(.2f,.2f,.7f,.5f); // safe zone
                                //glColor4f(.2f,.8f,.4f,.5f); // safe zone for mike (green)
                                glColor4f(.5f,.5f,.5f,.5f); // safe zone in greyscale
                        glVertex3f(sx1, sz1, sy1); // y is up!
                        glVertex3f(sx1, sz2, sy2); // y is up!
                        glVertex3f(sx2, sz3, sy2); // y is up!
                        glVertex3f(sx2, sz4, sy1); // y is up!
                glEnd();
                x1 += pSig->fXInc;
                x2 += pSig->fXInc;
        }
        y1 += pSig->fYInc;
        y2 += pSig->fYInc;
}
```

```
    // turn off color material lighting
    glDisable(GL_COLOR_MATERIAL);
}
```

APPENDIX B
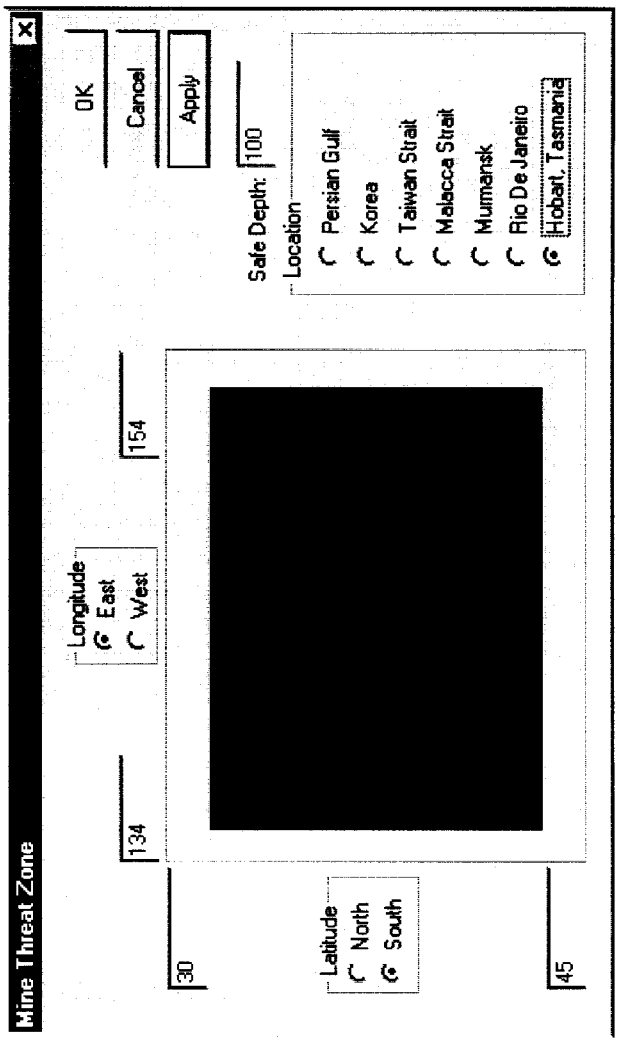

APPENDIX C

Mine Threat Zone

Longitude: ● East ○ West

Latitude: ○ North ● South 134, 154, 30, 45

Safe Depth: 300

Location:
○ Persian Gulf
○ Korea
○ Taiwan Strait
○ Malacca Strait
○ Murmansk
○ Rio De Janeiro
● Hobart, Tasmania OK | Cancel | Apply APPENDIX D

APPENDIX E

What is claimed is:

1. A method for displaying data pertaining to water mine threat on a display screen of a computer, said method comprising accessing information relating to the topography of a region which includes at least one body of water, selecting a water depth below which said water mine threat is considered an insignificant water mine threat and above which said water mine threat is considered a significant water mine threat, and displaying a map of said region which exhibits at least one of said insignificant water mine threat and said significant water mine threat.

2. A method for displaying data as recited in claim 1, said method comprising selecting said region.

3. A method for displaying data as recited in claim 2, wherein said accessing information is performed at least twice, wherein said selecting said region is performed at least twice, and wherein said displaying a map of said region is performed at least twice.

4. A method for displaying data as recited in claim 3, wherein for at least one said selected region, said displaying a map is performed twice, at least once displaying a said map which is characterized by two-dimensionality and at least once displaying a said map which is characterized by three-dimensionality.

5. A method for displaying data as recited in claim 2, wherein said selecting said region includes designating latitudinal coordinates and longitudinal coordinates associated with said region.

6. A method for displaying data as recited in claim 2, wherein said selecting said region includes designating a said region from among a plurality of preselected said regions.

7. A method for displaying data as recited in claim 2, wherein said selecting said region includes preselecting a plurality of said regions and designating a said region from among said plurality of preselected said regions.

8. A method for displaying data as recited in claim 1, wherein said map exhibits one of said insignificant water mine threat and said significant water mine threat.

9. A method for displaying data as recited in claim 1, wherein said map exhibits both of said insignificant water mine threat and said significant water mine threat, and wherein said map exhibits contrastingly the extent of said insignificant water mine threat versus the extent of said significant water mine threat.

10. A method for displaying data as recited in claim 1, wherein:
    said insignificant water mine threat and said significant water mine threat correspond to said at least one body of water;
    said region includes at least one portion of land;
    said map exhibits nonexistent water mine threat;
    said nonexistent water mine threat corresponds to said at least one portion of land;
    if said map exhibits said insignificant water mine threat but does not exhibit said significant water mine threat, said map exhibits contrastingly the extent of said insignificant water mine threat versus the extent of said nonexistent water mine threat;
    if said map exhibits said significant water mine threat but does not exhibit said insignificant water mine threat, said map exhibits contrastingly the extent of said significant water mine threat versus the extent of said nonexistent water mine threat; and
    if said map exhibits both said insignificant water mine threat and said significant water mine threat, said map exhibits contrastingly, versus each other, the extent of said insignificant water mine threat, the extent of said significant water mine threat and the extent of said nonexistent water mine threat.

11. A method for displaying data as recited in claim 1, wherein said displaying a map includes displaying a said map which is two-dimensional.

12. A method for displaying data as recited in claim 11, wherein said displaying a map includes displaying a said map which is three-dimensional.

13. A method for displaying data as recited in claim 1, wherein said selecting a water depth is performed at least twice, and wherein said displaying a map of said region includes displaying a map which, in association with each said selected water depth, exhibits at least one of said insignificant water mine threat and said significant water mine threat.

14. A method for visually representing a geographical area in terms of explosive threat such as mine threat to marine navigation, said method comprising:
    obtaining data pertaining to said geographical area from a geographical database, said data including information pertaining to the terrain of said geographical area;
    choosing at least one safe-depth, each said safe-depth at least approximately being the maximum marine depth beyond which a contemplated mine threat to a contemplated marine vessel is considered negligible; and
    graphically displaying said geographical area as indicative of mine threat sectionalization as a function of at least one said safe-depth, said mine threat sectionalization including at least one type of zone selected from the group consisting of land mass zone, mine threat zone and mine safety zone, said mine threat zone being at least substantially characterized by a marine bed which is shallower than said safe-depth, said mine safety zone being at least substantially characterized by a marine bed which is deeper than said safe-depth.

15. A method for visually representing a geographical area as recited in claim 14, wherein said choosing at least one safe-depth includes choosing at least two safe-depths, and wherein said graphically displaying said geographical area includes graphically displaying said geographical area as indicative of mine threat sectionalization as a function of every said safe-depth.

16. A method for visually representing a geographical area as recited in claim 14, wherein:
    said geographical area includes at least marine body;
    said terrain includes underwater terrain associated with said at least one marine body;
    said mine threat sectionalization inludes at least one mine threat zone and at least one mine safety zone; and
    said graphically displaying includes rendering an image wherein there is appreciable contrast between said at least one mine threat zone and said at least one mine safety zone.

17. A method for visually representing a geographical area as recited in claim 14, wherein:
    said mine threat sectionalization inludes at least one land mass zone; and
    said graphically displaying includes rendering an image wherein there is appreciable contrast among said at least one mine threat zone, said at least one mine safety zone and said at least one land mass zone.

18. A computer program product comprising a computer useable medium having computer program logic recorded thereon for enabling a computer to display data pertaining to water mine threat on a display screen of said computer, said computer program logic comprising means for enabling the computer to access information relating to the topography of at least one region which includes at least one body of water, means for enabling the computer to select at least one water depth below which said water mine threat is considered an insignificant water mine threat and above which said water mine threat is considered a significant water mine threat, and means for enabling the computer to display a map of at least one said region which exhibits, in relation to at least one said selected water depth, at least one of said insignificant water mine threat and said significant water mine threat.

19. A computer program product as recited in claim 18, wherein said means for choosing at least one safe-depth includes means for choosing at least two safe-depths, and wherein said means for graphically displaying said geographical area includes means for graphically displaying said geographical area as indicative of mine threat sectionalization as a function of every said safe-depth.

20. A computer program product as recited in claim 18, wherein said means for enabling the computer to display a map includes:
    means for enabling the computer to display a map characterized by two dimensions; and
    means for enabling the computer to display a map characterized by three dimensions.

21. A computer program product as recited in claim 18, wherein when said map exhibits both of said insignificant water mine threat and said significant water mine threat, said map exhibits contrastingly the extent of said insignificant water mine threat versus the extent of said significant water mine threat.

22. A computer program product as recited in claim 18, wherein:
    said insignificant water mine threat and said significant water mine threat correspond to said at least one body of water;
    said region includes at least one portion of land;
    said means for enabling the computer to display a map includes means for enabling the computer to display a map which exhibits nonexistent water mine threat;
    said nonexistent water mine threat corresponds to said at least one portion of land;
    if said map exhibits said insignificant water mine threat but does not exhibit said significant water mine threat, said map exhibits contrastingly the extent of said insignificant water mine threat versus the extent of said nonexistent water mine threat;
    if said map exhibits said significant water mine threat but does not exhibit said insignificant water mine threat, said map exhibits contrastingly the extent of said significant water mine threat versus the extent of said nonexistent water mine threat; and
    if said map exhibits both said insignificant water mine threat and said significant water mine threat, said map exhibits contrastingly, versus each other, the extent of said insignificant water mine threat, the extent of said significant water mine threat and the extent of said nonexistent water mine threat.

23. A computer program product for use in a computer system having a central processor for implementing graph display management on a user interface display screen, said computer program product enabling visual representation of a geographical area in terms of explosive threat such as mine threat to marine navigation, said computer program product comprising:
    a recording medium;
    means, recorded on said recording medium, for obtaining data pertaining to said geographical area from a geographical database, said data including information pertaining to the terrain of said geographical area;
    means, recorded on said recording medium, for choosing at least one safe-depth, each said safe-depth at least approximately being the maximum marine depth beyond which a mine threat to a contemplated marine vessel is considered negligible; and
    means, recorded on said recording medium, for graphically displaying said geographical area as indicative of mine threat sectionalization as a function of at least one said safe-depth, said mine threat sectionalization including at least one type of zone selected from the group consisting of land mass zone, mine threat zone and mine safety zone, said mine threat zone being at least substantially characterized by a marine bed which is shallower than said safe-depth, said mine safety zone being at least substantially characterized by a marine bed which is deeper than said safe-depth.

24. Apparatus comprising processing means, said processing means having a memory, said processing means containing a data representation pertaining to water mine hazard posed to navigation, said data representation being generated, for availability for containment by said processing means, by the method comprising:
    selecting a region which includes at least one body of water;
    accessing information relating to the topography of said region; and
    in relation to said at least one body of water, selecting a water depth below which said water mine hazard is considered an insignificant water mine hazard and above which said water mine hazard is considered a significant water mine hazard.

25. Apparatus as recited in claim 24, said apparatus comprising display means, wherein:
    said data representation is adaptable to use in association with said display means;
    said display means is capable of displaying a map of said region which shows at least one of said insignificant water mine hazard and said significant water mine hazard;
    if said map shows both of said insignificant water mine hazard and said significant water mine hazard, said map shows contrastingly the scope of said insignificant water mine hazard versus the scope of said significant water mine hazard;
    if said region includes at least one portion of land, said visual display is capable of including said map which shows nonexistent water mine hazard, said nonexistent water mine hazard corresponding to said at least one portion of land;
    if said map shows said insignificant water mine hazard and said nonexistent water mine hazard but does not show said significant water mine hazard, said map shows contrastingly the scope of said insignificant water mine hazard as distinguished from the scope of said nonexistent water mine hazard;
    if said map shows said significant water mine hazard and said nonexistent water mine hazard but does not show said insignificant water mine hazard, said map shows contrastingly the scope of said significant water mine hazard as distinguished from the scope of said nonexistent water mine hazard; and if said map shows said insignificant water mine hazard, said significant water mine hazard and said nonexistent water mine hazard, said map shows contrastingly, as distinguished from each other, the scope of said insignificant water mine hazard, the scope of said significant water mine hazard and the scope of said nonexistent water mine hazard.

26. A system for visualizing navigational risk associated with water mine capability which may exist in a geographical region which includes water, said system comprising:
   means for accessing information relating to the topography of said region;
   means for selecting a delimitative depth of said water, wherein at water mine situation depths greater than said delimitative depth said navigational risk is deemed an inconsequential risk, and wherein at water mine situation depths lesser than said delimitative depth said navigational risk is deemed a consequential risk; and
   means for displaying a map of said region, wherein said map illustrates at least one of said inconseqential risk and said consequential risk, and wherein when said map illustrates both of said inconsequential risk and said consequential risk, said map illustrates said inconsequential risk and said consequential risk in contrast to each other.

27. A system for visualizing navigational risk as recited in claim 26, wherein said region includes land, wherein when said map illustrates said inconsequential risk, said map illustrates said land and said inconsequential risk in contrast to each other, and wherein when said map illustrates said consequential risk, said map illustrates said land and said consequential risk in contrast to each other.

28. A system for visualizing navigational risk as recited in claim 26, comprising means for selecting said geographical region.

* * * * *